(No Model.)
H. M. WHITNEY.
BAG FASTENER.
No. 561,299. Patented June 2, 1896.
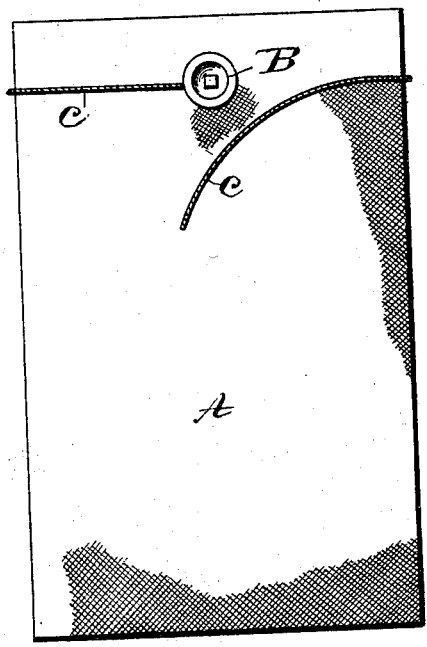
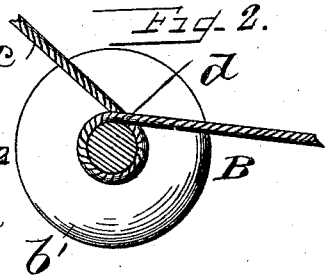
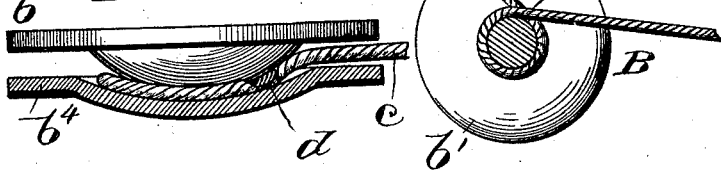
Witnesses
G. A. Tauberschmidt
J. D. Kingsbury
Inventor
Hugh M. Whitney
By Whitaker & Prevost, Attys.

UNITED STATES PATENT OFFICE.

HUGH M. WHITNEY, OF MINNEAPOLIS, MINNESOTA.

BAG-FASTENER.

SPECIFICATION forming part of Letters Patent No. 561,299, dated June 2, 1896.

Application filed October 7, 1895. Serial No. 564,947. (No model.)

*To all whom it may concern:*

Be it known that I, HUGH M. WHITNEY, a citizen of the United States, residing at Minneapolis, in the county of Hennepin and State of Minnesota, have invented certain new and useful Improvements in Bag-Fasteners; and I do hereby declare the following to be a full, clear, and exact description of the invention, such as will enable others skilled in the art to which it appertains to make and use the same.

My present invention is an improvement in bag-fasteners; and it consists in a novel construction of parts which enables me to secure the cord easily and effectively in the desired position.

In the accompanying drawings I have illustrated the best forms in which I have contemplated embodying my invention, which is fully disclosed in the following description and claim.

Figure 1 is a view of a bag with my device attached. Fig. 2 is a horizontal sectional view showing the disposition of the cord when fastened. Fig. 3 is a sectional view of my fastener. Fig. 4 a is further enlarged view showing the interlocking of the cords.

My improved cord-fastener is formed of two disks $b^4$ $b^5$ and are of separate pieces of material, which are held together to form the fastener B by the rivet $b^6$, which passes centrally through the two disks. The curvature of one of the disks is greater than that of the other, and when the two are brought together there is formed a converging cord-receiving recess, which curves away or downward from the peripheral opening. In this case I have shown the disks as having annular parallel surfaces $e$ adjacent to the periphery of the disks; but this is not essential. In placing the cord within the recess the end nearest the hand is naturally drawn into the recess above the other portion, and the outer edge of the disk serves to hold the other portion out of a straight line and farther around the part last drawn into the recess. (See Fig. 4.)

While I have here shown the device as applied to and used for the purpose of securing the cord used to close a bag, it may be used for many other purposes, such as the fastening of corset-laces and laces for shoes and gloves. It may also be used for securing cords or ropes used for clothes-lines and other purposes.

It should be borne in mind that it is essential to the successful operation of the fastener that there be the two hard unyielding surfaces opposed to each other with the converging recess between them.

What I claim, and desire to secure by Letters Patent, is—

A fastener for securing cords consisting of two disks having opposed unyielding concavo-convex surfaces, forming a groove converging toward the center of the fastener, the point of convergence being out of line with the opening at the peripheries of the disks, substantially as described.

In testimony whereof I affix my signature in presence of two witnesses.

HUGH M. WHITNEY.

Witnesses:
    JAMES D. SHEARER,
    C. J. CAHALEY.